United States Patent
Arunachalam et al.

(10) Patent No.: US 11,910,289 B2
(45) Date of Patent: Feb. 20, 2024

(54) SYSTEMS AND METHODS FOR WIRELESS AUDIO

(71) Applicant: Harman International Industries, Incorporated, Stamford, CT (US)

(72) Inventors: Srinath Arunachalam, Dallas, TX (US); Jagan Lokanatha, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 247 days.

(21) Appl. No.: 17/228,470

(22) Filed: Apr. 12, 2021

(65) Prior Publication Data

US 2022/0329998 A1 Oct. 13, 2022

(51) Int. Cl.
*H04W 4/80* (2018.01)
*H04R 3/12* (2006.01)
*H04W 84/20* (2009.01)

(52) U.S. Cl.
CPC ............... *H04W 4/80* (2018.02); *H04R 3/12* (2013.01); *H04W 84/20* (2013.01); *H04R 2420/07* (2013.01)

(58) Field of Classification Search
CPC ....... H04W 4/80; H04W 84/20; H04W 84/18; H04W 4/08; H04W 88/181; H04W 76/14; H04R 3/12; H04R 2420/07; H04R 3/00; H04L 65/611; H04L 67/1044; H04L 67/12; H04L 67/1046
USPC .......................................... 455/41.2
See application file for complete search history.

(56) References Cited

U.S. PATENT DOCUMENTS

| | | | |
|---|---|---|---|
| 2012/0099594 A1* | 4/2012 | Lau | H04L 12/2807 370/392 |
| 2017/0244576 A1 | 8/2017 | Batra et al. | |
| 2020/0059784 A1 | 2/2020 | Batra et al. | |
| 2020/0396028 A1 | 12/2020 | Haartsen et al. | |

(Continued)

OTHER PUBLICATIONS

Chen, M., "Sychronization of Bluetooth Low Energy Isochronous Transmissions," U.S. Appl. No. 17/075,590, filed Oct. 20, 2020, 91 pages.

(Continued)

*Primary Examiner* — Eugene Yun
(74) *Attorney, Agent, or Firm* — McCoy Russell LLP

(57) ABSTRACT

Examples are disclosed for systems and methods for supporting transmission of audio streams (e.g., streams of audio data or audio information) for different audio signals to different end-point devices. In one embodiment, a method comprises forming, with a Bluetooth® Classic or BR/EDR based master circuitry, a piconet with a plurality of Bluetooth® Classic or BR/EDR based slave circuitries through a respectively corresponding plurality of point-to-point wireless connections; and generating, from the master circuitry, a plurality of streams of packets respectively corresponding to the plurality of point-to-point wireless connections, wherein the plurality of streams of packets respectively correspond to a plurality of distinct transport identifiers; wherein the plurality of streams of packets carry audio data for different audio channels; and wherein the plurality of streams of packets are for BR/EDR transmission in compliance with revision 2.0 of the Bluetooth® core specification.

20 Claims, 9 Drawing Sheets

(56) References Cited

U.S. PATENT DOCUMENTS

2021/0084089 A1* 3/2021 Mitra ...................... H04L 65/60
2022/0191615 A1* 6/2022 Goupy ................. G10L 19/167

OTHER PUBLICATIONS

Chen, M., "Dynamic Buffer Allocation for Bluetooth Low Energy Isochronous Transmissions," U.S. Appl. No. 17/075,596, filed Oct. 20, 2020, 91 pages.

Chen, M., "Synchronization of Bluetooth Energy Transmissions Across Connected Sochronous Groups," U.S. Appl. No. 17/075,601, filed Oct. 20, 2020, 91 pages.

European Patent Office, Extended European Search Report Issued in Application No. 22167283.5, dated Jun. 22, 2022, Germany, 7 pages.

* cited by examiner

SYSTEMS AND METHODS FOR WIRELESS AUDIO

FIELD

The disclosure relates generally to the transmission of audio signals in Bluetooth® Classic based wireless audio systems.

BACKGROUND

Devices for producing sound (e.g., speakers) may be connected to a wireless network in order to receive audio data and/or other traffic from the network. For example, audio data may be transmitted wirelessly from a source device to a target device, such as a speaker. The source device may also adjust volume, equalization, and/or other settings to provide desired audio playback, and wireless connectivity of the source and target devices may allow for a greater flexibility of positioning of the target device over wired audio devices.

The Bluetooth® Classic or Bluetooth® Basic Rate/Enhanced Data Rate (BR/EDR) wireless standards support the connection of end-point devices to a master device. (Bluetooth® is a registered trademark of the Bluetooth Special Interest Group, Incorporated, headquartered in Kirkland, Washington) However, Bluetooth® Classic or BR/EDR based audio transmission uses the Advanced Audio Distribution Profile (A2DP), which may merely support audio transmission to one device at a time, where audio might not be transmitted concurrently from the master device to multiple end-point devices (e.g., slave devices). For example, in a home audio system, while the BR/EDR wireless standards may allow a Bluetooth® enabled sound bar to connect to a plurality of Bluetooth® enabled speakers or headphones, the A2DP profile might not allow the sound bar to transmit audio to the plurality of Bluetooth® enabled speakers or headphones. Additionally, BR/EDR specifications and the A2DP profile do not support transmission of audio streams (e.g., streams of audio data or audio information) for different audio signals to different end-point devices. For example, in a vehicle, transmission of audio signals by a single transmitting (e.g., master) device of the vehicle to passengers wishing to listen to different audio content independently via headphones might not be supported.

SUMMARY

In various embodiments, the issue described above may be addressed by a method, comprising forming, with a Bluetooth® Classic or BR/EDR-based master circuitry, a piconet with a plurality of Bluetooth® Classic or BR/EDR-based slave circuitries through a respectively corresponding plurality of point-to-point wireless connections; and generating, from the master circuitry, a plurality of streams of packets respectively corresponding to the plurality of point-to-point wireless connections, wherein the plurality of streams of packets respectively correspond to a plurality of distinct transport identifiers; wherein the plurality of streams of packets carry audio data for different audio channels; and wherein the plurality of streams of packets are for BR/EDR transmission in compliance with revision 2.0 of the Bluetooth® core specification. To implement the method, a plurality of modules may be created in an audio subsystem of an operating system within the Bluetooth® stack, where each module of the plurality of modules may be used to connect to a different Bluetooth® device via a distinct transport identifier and a distinct A2DP profile. In this way, different audio signals may be transmitted to different users of a sound system via a plurality of Bluetooth® enabled devices.

Additionally, the audio subsystem may control a packet type transmitted by the master circuitry. For example, the audio subsystem may command a baseband circuitry of the master circuitry to send a packet type with a desired bitrate (e.g., a 3-DH5 packet) to achieve a target audio quality. Further, an encoding of the packet may be adjusted to reduce the bitrate of the 3-DH5 packet, for example, when additional concurrent audio signals are desired to be transmitted and there are bandwidth constraints.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
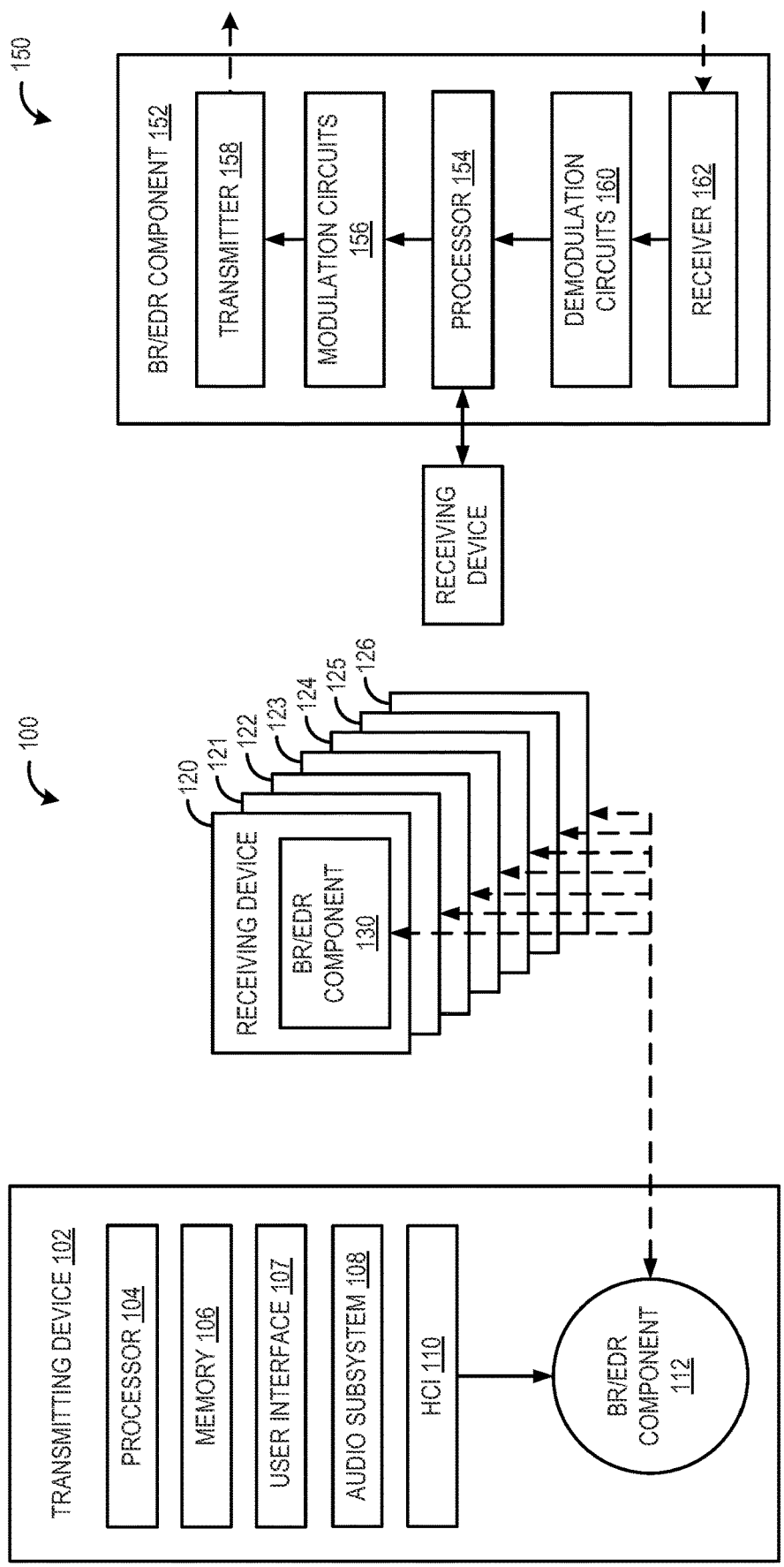
FIG. 1A is a schematic block diagram of a wireless audio system including a broadcasting audio device and a plurality of receiving devices connected via a piconet, in accordance with one or more embodiments of the present disclosure.
FIG. 1B is a schematic block diagram of a Bluetooth® Classic or Basic Rate/Enhanced Data Rate (BR/EDR) component, in accordance with one or more embodiments of the present disclosure.

The following detailed description relates to a wireless audio system comprising a Bluetooth® master device or circuitry (also referred to herein as a transmitting device) that transmits one or more audio signals to one or more slave devices or circuitries (also referred to herein as receiving devices), where the master device is connected to the one or more slave devices via point-to-point wireless connections forming a piconet. As used herein, the term "audio signal" encompasses signaling for a device for producing sound (e.g., a speaker). The signaling may include digitized audio information (e.g., digitized information for use in driving the sound-producing device, such as a substantially continuous stream of digitized information for driving the sound-producing device). In some embodiments, the digitized audio information may have been converted from an analog form. The digitized audio information may be transmitted in accordance with a protocol for wireless communication (e.g., a Bluetooth® specification), such as by being incorporated in a stream of packets carrying the digitized audio information in compliance with the protocol. Subsequently, the digitized audio information may be received in accordance with the protocol, and may then be used to drive the sound-producing device.

Transmitting the audio signal may comprise encoding the audio signal into a stream of packets that are transmitted from a transmitting device to a receiving device in accordance with one or more Bluetooth® profiles and/or protocols. For example, the wireless audio system may be a home stereo system with a combination of wired and wireless speakers arranged within a home environment, or the wireless audio system may be an onboard entertainment system of a vehicle, where audio signals may be transmitted by a central transmitting device to passengers in different seats of the vehicle (e.g., via individual wireless speakers, headphones, etc.), or the wireless audio system may be a portable sound system comprising a portable stereo system (e.g., a boom box, etc.) and a plurality of independent Bluetooth® enabled speakers, headphones, smart phones, et cetera. It should be appreciated that the embodiments and examples provided herein are for illustrative purposes, and different embodiments and examples with other types of devices may be included without departing from the scope of this disclosure.

In typical Bluetooth® wireless audio systems, audio signals are transmitted using an Advanced Audio Distribution Profile (A2DP) implemented in an audio subsystem of an operating system of the transmitting device. In some instances, a single A2DP profile might support an audio signal having a single channel (e.g., a single speaker or sound-producing device). In other instances, a single A2DP profile might support an audio signal having multiple channels (e.g., left and right channels for implementing two-channel stereo), where the channels are separated by the receiving device and directed to appropriate speakers via wired connections. However, a single A2DP audio signal might not be transmitted to a plurality of receiving devices (e.g., to a plurality of wireless Bluetooth® speakers). To support transmitting audio to more than one receiving device while using devices compliant with Bluetooth® Classic Bluetooth® BR/EDR wireless standards, one or more elements of the Bluetooth® stack may be modified to support concurrent transmission of a plurality of distinct audio signals (e.g., up to a maximum number), each distinct audio signal corresponding with a distinct A2DP profile, while maintaining audio playback quality above a threshold quality. The plurality of audio signals may correspond to different audio channels (e.g., for stereo speakers, or for surround-sound speakers) for the same audio content (e.g., audio programming such as songs, or audio portions of video programming), or may correspond to different speakers providing different audio content (e.g., for independent headphones), or any combination thereof.

FIG. 1A shows a wireless audio system, comprising a transmitting device (e.g., a master device) and a plurality of receiving devices (e.g., slave devices). The transmitting device and each of the receiving devices may include a Bluetooth® Basic Rate/Enhanced data Rate (BR/EDR) component to transmit audio signals in compliance with revision 2.0 and/or revision 4.0 of the Bluetooth® core specification, such as the BR/EDR component shown in FIG. 1B. An audio subsystem of the wireless audio system, such as the audio subsystem 200 of FIG. 2, may create and maintain a plurality of Bluetooth® connection modules to accommodate transmitting a plurality of audio signals, each with a distinct A2DP. A first example configuration of the wireless audio system is shown in FIG. 3A, where a plurality of audio signals may be transmitted to Bluetooth® enabled speakers of a home stereo system. A second example configuration of the wireless audio system is shown by FIG. 3B, where the plurality of audio signals may be transferred from the Bluetooth® enabled speakers of the home stereo system to one or more headphones. A third example configuration of the wireless audio system is shown in FIG. 3C, where the plurality of audio signals may be transmitted to additional Bluetooth® enabled speakers of the home stereo system. In a fourth example configuration shown in FIG. 3D, the plurality of audio signals may be transmitted to Bluetooth® enabled speakers from a portable stereo system, such as a boom box. In an audio system of a vehicle, a plurality of audio signals, including from different audio files or sources, may be transmitted to passengers sitting in different seats of the vehicle via personal Bluetooth® enabled devices, as shown in FIG. 4A, or via different wireless speakers of the vehicle, as shown in FIG. 4B. In some embodiments, the audio signals may be generated and transmitted by a following a procedure such as method 500 of FIG. 5.

Referring now to FIG. 1A, a wireless audio system 100 is shown, comprising a first circuitry in a transmitting device 102, and a plurality of second circuitries in receiving devices 120-126, where the transmitting device 102 forms a piconet with the receiving devices 120-126 through a respectively corresponding plurality of point-to-point wireless connections. For example, in some embodiments, the transmitting device 102 may be a sound bar of a home stereo system, and the plurality of receiving devices 120-126 may include one or more Bluetooth® enabled speakers located within a threshold receiving distance (e.g., within 30 feet) of the transmitting device 102. In other embodiments, the transmitting device 102 may be a portable sound system (e.g., a boom box), a smart phone, a tablet, a computer, or any device with circuitry capable of transmitting wireless audio signals, and the plurality of receiving devices 120-126 may be headphones, portable speakers, or any other device with circuitry capable of receiving wireless audio signals (e.g., for playback to a user).

When the plurality of receiving devices 120-126 are within the threshold receiving distance, they may be automatically identified by the transmitting device 102 (e.g., at startup). In some cases, one or more of the plurality of receiving devices 120-126 may be portable and/or handheld devices, such as a portable Bluetooth® enabled speaker, a pair of headphones, etc., where if the portable device enters the threshold receiving distance, the portable device is automatically registered as one of the receiving devices 120-126, and if the portable device leaves or is outside the threshold receiving distance, the portable device is automatically delisted as one of the receiving devices 120-126.

The transmitting device 102 may include a processor 104. The processor 104 may control the operations of the wireless audio system 100 and flow of signals between the transmitting device 102 and the receiving devices 120-126. For example, the processor 104 may control the operation of the wireless audio system 100 in response to a control signal from a user interface (UI) 107. In some embodiments, the UI 107 is integrated into the transmitting device 102, where a user may interact with, adjust, or select control elements in the UI 107 (e.g., buttons, knobs, touchscreen elements, etc.) to send one or more control signals to the processor 104 from the UI 107. In other embodiments, the UI 107 is not integrated into the transmitting device 102, and the user may interact with, adjust, or select control elements in the UI 107 via a user input device, such as a mouse, track ball, touchpad, etc., or the operator may interact with the UI 107 via a separate touchscreen, where the operator touches a display screen of the UI 107 to interact with the UI 107, or via another type of input device.

The control signal received by the UI 107 may include a selection of audio content to play (e.g., audio files, audio streams available on a network, etc.), or a request for more or less volume, or a request to pause playback of the audio content, and so forth. Audio content may inherently be partitioned into audio channels for delivery to one or more desired receiving devices (e.g., left and right channels for stereo audio content, or more numerous channels for surround-sound audio content). Alternatively, the control signal received by the UI 107 may include a request to deliver the audio content to one or more desired receiving devices of the plurality of the receiving devices 120-126. For example, the user may view a list of available receiving devices on a screen of the UI 107, and select the one or more desired receiving devices from which to listen to the audio content via one or more buttons of the UI 107. The transmitting device 102 may then transmit to the one or more desired receiving devices one or more respectively corresponding audio signals for the audio content. Additionally, if a first set of audio content is being streamed to one or more desired receiving devices, the control signal received by the UI 107 may include stopping transmission of the first set of audio content to the one or more of the desired receiving devices, and starting transmission of a second set of audio content to the one or more desired receiving devices, or redirecting one or more audio signals from being transmitted to a first receiving device to being transmitted to a second receiving device of the receiving devices 120-126. Further, the control signal received by the UI 107 may include a request to transmit a plurality of audio signals concurrently to the desired receiving devices, where the plurality of audio signals may reflect the same audio content, or may reflect different audio content.

As an example, a first user of the wireless audio system 100 may request to play a first set of audio content (e.g., a plurality of audio signals for a song or other audio performance) to a plurality of speakers via a sound bar of the wireless audio system 100. The wireless audio system 100 may transmit a first audio signal of the first set of audio content (e.g., a stream of packets encoding the first audio signal) and a second audio signal of the first set of audio content from the transmitting device 102 of the wireless audio system 100 to the receiving devices 120 and 121 (e.g., to two front speakers facing the user), respectively, in a first room of a home. The transmitting device 102 may additionally transmit a third audio signal and a fourth audio signal of the first set of audio content from the transmitting device 102 to the receiving devices 122 and 123 (e.g., background speakers, to add surround sound).

If the first user has to leave the first room (e.g., to go to a kitchen of the home, etc.) and wishes to listen to the first set of audio content while not in the first room, the first user may request, via the UI 107, that the wireless audio system 100 stop transmitting the second, third, and fourth audio signals to the receiving devices 121, 122, and/or 123, respectively, and to redirect the first audio signal to a portable receiving device 124. The first user may then listen to the first audio signal on the portable receiving device 124 (e.g., headphones, for cases in which the first audio signal includes audio information for both a left channel and a right channel) while not in the first room.

If the first user returns to the first room, the first user may request that the wireless audio system 100 stop transmitting the first audio signal to the portable receiving device 124 (e.g., headphones), and reinitiate transmission of the first, second, third, and fourth audio signals to the receiving devices 120, 121, 122, and/or 123, respectively (e.g., the speakers). Alternatively, the first user may request that a fifth audio signal be transmitted to the portable receiving device 124 in addition to transmitting the first, second, third, and fourth audio signals to the receiving devices 120, 121, 122, and/or 123, respectively. In this way, the first user may select one or more of the receiving devices 120-126 from which the first user would like to listen to the first audio file.

While the first user is listening to the first set of audio content in the first room via the first, second, third, and fourth audio signals, a second user may use the UI 107 to request to additionally play the first set of audio content in a second room of the home within range of wireless audio system 100, for example by transmitting a fifth audio signal and a sixth audio signal to the receiving devices 125 and 126, respectively (e.g., a second set of speakers), where the fifth audio signal and the sixth audio signal may be substantially similar to the first audio signal and the second audio signal. The wireless audio system 100 may transmit the fifth audio signal and the sixth audio signal to the second user in the second room via the receiving devices 125 and 126, respectively, while concurrently streaming the first, second, third, and fourth audio signals to the first user in the first room via the receiving devices 120, 121, 122, and 123.

While the first user is listening to the first set of audio content in the first room and the second user is listening to the first set of audio content in the second room, a third user who wishes to listen to a second set of audio content may request that the wireless audio system 100 stream the second set of audio content to the portable receiving device 126 via a seventh audio signal. For example, the third user may have a personal receiving device (e.g., pair of headphones, speaker, etc.), which may become registered as a new audio receiving device of the wireless audio system 100 when the user turns on the personal device within the threshold receiving distance of the transmitting device 102, and the third user may use the UI 107 to assign the seventh audio signal to the audio receiving device 126. In this way, a plurality of users may use the wireless audio system 100 to concurrently play and switch between one or more audio signals, where the one or more audio signals may correspond to the same audio content (e.g., different channels for the same audio content), or may correspond to different audio content.

In some embodiments, a maximum number of different, concurrent audio signals may be permitted (e.g., 7 concurrent audio signals), where if the maximum number of concurrent audio signals is reached, no additional new audio signals may be transmitted to the receiving devices 120-126. In one example, the maximum number of different, concurrent audio signals may depend on an available bandwidth and a bitrate of a packet type used to stream the concurrent audio signals, whereby reducing the bitrate of the packet type the maximum number of different, concurrent audio signals may be increased. As described in greater detail below in reference to FIG. 5, one or more encoding parameters may be adjusted to reduce a bitrate of one or more of the existing concurrent audio signals and/or the new audio signal. Once the maximum number of different, concurrent audio signals has been reached, to transmit a new audio signal, transmission of one of the existing concurrent audio signals may have to be stopped, whereby the maximum number of different audio signals may no longer be reached.

Returning to FIG. 1A, the processor 104 may execute instructions stored on a memory 106 to control the transmitting device 102 to transmit one or more audio signals wirelessly. As discussed herein, the memory 106 may include any non-transitory computer readable medium in which programming instructions are stored. For the purposes of this disclosure, the term "tangible computer readable medium" is expressly defined to include any type of computer readable storage. The example methods and systems may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device. In various embodiments, the memory 106 may include an SD memory card, an internal and/or external hard disk, USB memory device, or similar modular memory used to store a plurality of audio files, which may be selected by a user (e.g., via the UI 107) and streamed to the receiving devices 120-126.

The transmitting device 102 may include an audio subsystem 108. In various embodiments, the audio subsystem 108 may be a software component of an operating system of a Bluetooth® technology stack of the transmitting device 102 that is responsible for processing one or more audio signals transmitted by the transmitting device 102 to the receiving devices 120-126. Processing one or more audio signals may include packetizing (or re-packetizing) audio data to generate a stream of packets that may be transmitted from the transmitting device 102 to the receiving devices 120-126, or the audio subsystem 108 may generate a plurality of streams of packets that may be transmitted from the transmitting device 102 to the receiving devices 120-126, where a number of streams of packets respectively correspond to an equal number of wireless connections with an equal number of receiving devices 120-126. In one embodiment, the audio subsystem 108 is PulseAudio, and the Bluetooth® technology stack of the transmitting device 102 uses a Berkeley Software Distribution (BSD) operating system such as Linux, FreeBSD, Open BSD, macOS, or another unix-based operating system (e.g., Illumos, Solaris, etc.). An example audio subsystem is described in greater detail below in reference to FIG. 2.

The transmitting device 102 may include a BR/EDR hardware component 112 and/or a baseband circuitry operable to transmit data to and/or receive data from one or more of the receiving devices 120-126 in compliance with at least revision 2.0 of the Bluetooth® core specification. In some embodiments, the BR/EDR hardware component 112 and/or the baseband circuitry may receive data from and/or transmit data to the transmitting device 102 in compliance with revision 4.0 of the Bluetooth® core specification. Similarly, each of the receiving devices 120-126 may include a BR/EDR hardware component 130 and/or a baseband circuitry operable to transmit and/or receive data via Bluetooth® to and/or from the transmitting device 102. In some embodiments, the BR/EDR hardware components 112 and/or 130 are chips (e.g., semiconductor-based electronic devices), or parts of chips electronically integrated with the circuitry of the transmitting device 102 and/or the receiving devices 120-126, where the chips or parts of chips may be accessed via the processor 104 of the transmitting device 102 or a processor of the receiving devices 120-126 (not shown in FIG. 1A). In other embodiments, the BR/EDR hardware component 112 and/or 130 may be a USB device that includes a BR/EDR chip, where the USB device is connected to the transmitting device 102 and/or the receiving devices 120-126 via a USB port.

In some embodiments, the data transmitted by the transmitting device 102 to the receiving devices 120-126 includes one or more audio signals processed by the audio subsystem 108. For example, via the UI 107, a user of the wireless audio system 100 may select a set of audio content to play on one or more of the receiving devices 120-126. In some embodiments, the audio content is an audio file selected from a list of audio files stored in the memory 106 (e.g., on a sound card, etc.).

The audio subsystem 108 may packetize one or more respectively corresponding audio signals of the audio content for transmission to the one or more receiving devices 120-126, based on one or more respectively corresponding A2DPs, as described in greater detail below in reference to FIG. 2. Each of the A2DPs may be assigned a transport identifier associated with a receiving device of the one or more receiving devices 120-126 to which to transmit a corresponding audio signal. The audio subsystem 108 may generate a stream of packets for each of the corresponding audio signals, which may be passed from the audio subsystem 108 to the BR/EDR hardware component 112 via a hardware controller interface (HCI) 110, which may manage communication between the audio subsystem 108 and the BR/EDR hardware component 112. The streams of packets generated from the audio content may be transmitted by the BR/EDR hardware component 112 and subsequently received by the one or more of the receiving devices 120-126 of the wireless audio system 100, based on the transport identifiers. If the user wishes to redirect one or more of the audio signals to one or more different receiving devices of the one or more receiving devices 120-126, the audio subsystem 108 may assign one or more new transport identifiers to the one or more redirected audio signals, whereby the BR/EDR hardware component 112 may redirect the one or more redirected audio signals to the one or more different receiving devices.

FIG. 1B shows an example audio system portion 150 having a Bluetooth® Classic or BR/EDR component 152, which may be substantially similar to the BR/EDR hardware component 112 of the transmitting device 102 and/or the BR/EDR hardware component 130 of the receiving devices 120-126. The BR/EDR component 152 includes circuitry to function as a wireless radio frequency (RF) transmitter 158 that sends wireless signals, and as a wireless RF receiver 162 that receives wireless signals. For example, the BR/EDR hardware component 112 of the transmitting device 102 may transmit one or more audio signals via the transmitter 158 of the BR/EDR hardware component 112, and one or more of the receiving devices 120-126 may receive the audio signals transmitted by the BR/EDR hardware component 112 via an equal number of receivers 162 of the BR/EDR hardware components 130 of the receiving devices 120-126.

In some embodiments, the BR/EDR component 152 includes a processor 154, which may control the transmitting and/or receiving of wireless data, including audio signals, to and from other BR/EDR components 152. To transmit data (e.g., audio data) via the transmitter 158, the processor 154 may receive the data from an HCI (e.g., the HCI 110 of the audio subsystem 108 of the transmitting device 102). In another example, the BR/EDR component 152 does not include a processor 154, and the BR/EDR component 152 includes a custom purpose circuitry that may accept data from an HCI (which may be packetized to some degree) for transmission via Bluetooth®, and may supply data received via Bluetooth® (which may also be packetized to some degree) to an HCI.

The processor 154 may encode the data into a wireless signal via one or more modulation circuits 156. The one or more modulating circuits 156 may employ one or more modulation techniques, such as Gaussian Frequency Shift Keying (GFSK), π/4 differential phase shift keying (π/4 DQPSK), and/or eight-point phase shift keying (8DQPSK), to shift a frequency of the wireless signal between a plurality of available frequencies (e.g., within the 2.4 GHz industrial, scientific, and medical (ISM) band) based on a pre-determined hop sequence and a standard hopping rate (e.g., 1600 hops per second). By using a frequency hopping approach, the BR/EDR component 152 may minimize an interference with other wireless signals on the 2.4 GHz ISM band and increase a reliability of the transmission. Similarly, to interpret a wireless signal received by the receiver 162 of the BR/EDR component 152, the processor 154 may use one or more demodulation circuits 160 to demodulate the wireless signal, also based on the pre-determined hop sequence and a standard hopping rate.

For example, a receiver 162 of the BR/EDR component 130 of the receiving device 120 may receive an audio signal from a transmitter 158 of the BR/EDR component 112 of the transmitting device 102 (e.g., as a stream of packets carrying the audio signal). The processor 154 of the BR/EDR component 130 of the receiving device 120 may demodulate the audio signal via the demodulation circuits 160 of the BR/EDR component 130 of the receiving device 120 to recover the stream of packets carrying the audio signal. The audio signal may then be transferred to other portions of the receiving device 120 and rendered at a speaker of the receiving device 120.

Additionally, the BR/EDR hardware component 112 and/or baseband circuitry of transmitting device 102 may support a plurality of concurrent wireless connections to which and/or from which data may be transmitted and/or received. For example, in the wireless audio system 100 of FIG. 1A, the plurality of receiving devices 120-126 (e.g., slave devices) may receive audio and/or other data from the transmitting device 102 (e.g., the master device) via a respectively corresponding plurality of point-to-point wireless connections. For example, the audio subsystem 108 may process a plurality of audio signals, where each audio signal is encoded as a stream of packets and transmitted by the BR/EDR component 112 (e.g., 152) to one or more of the plurality of receiving devices 120-126. In other words, the audio subsystem 108 may process a first audio signal that is transmitted to the receiving device 120, a second audio signal that is transmitted to the receiving device 121, a third audio signal that is transmitted to the receiving device 122, and so forth, where the first, second and third audio signals may be based on one or more sets of audio content (e.g., audio files).

Figure 2:
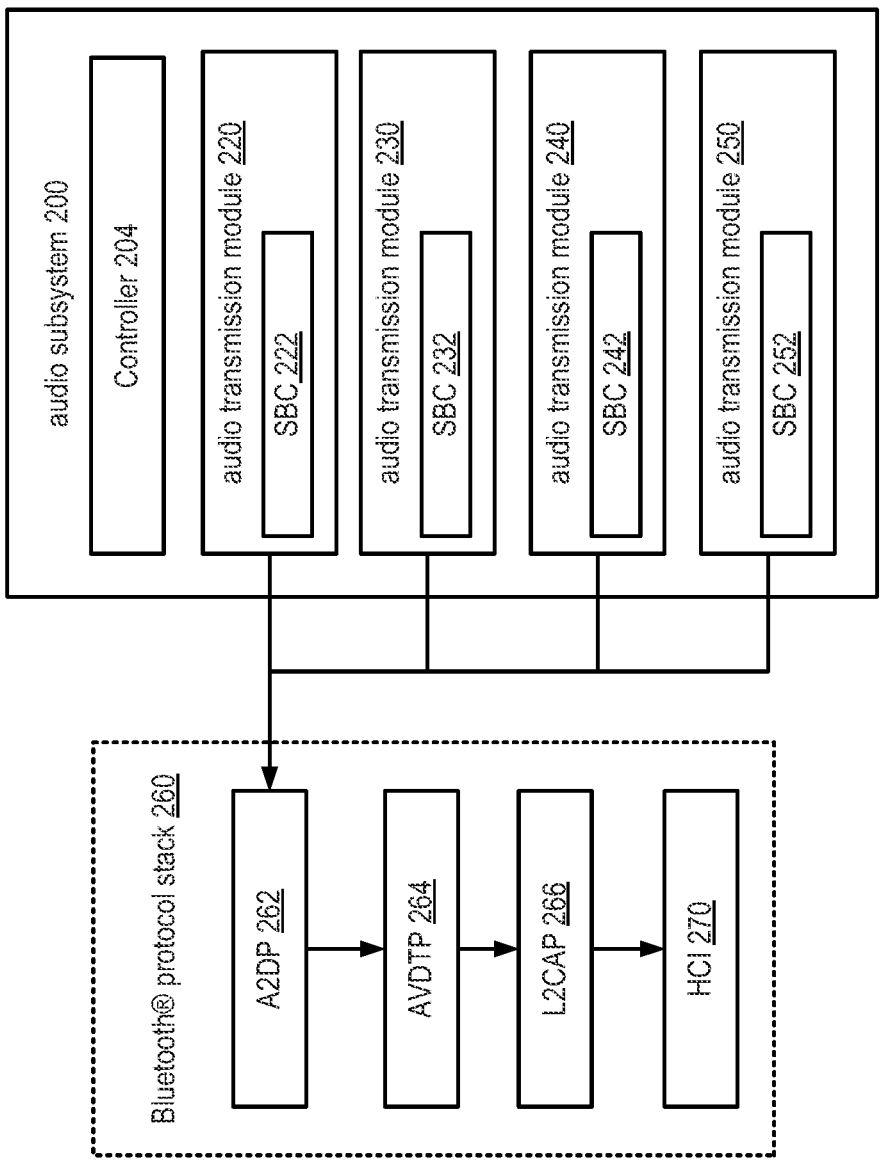
FIG. 2 is a schematic block diagram of an audio subsystem with multiple Bluetooth® Classic or BR/EDR-based connections, in accordance with one or more embodiments of the present disclosure.
Figure 3A:
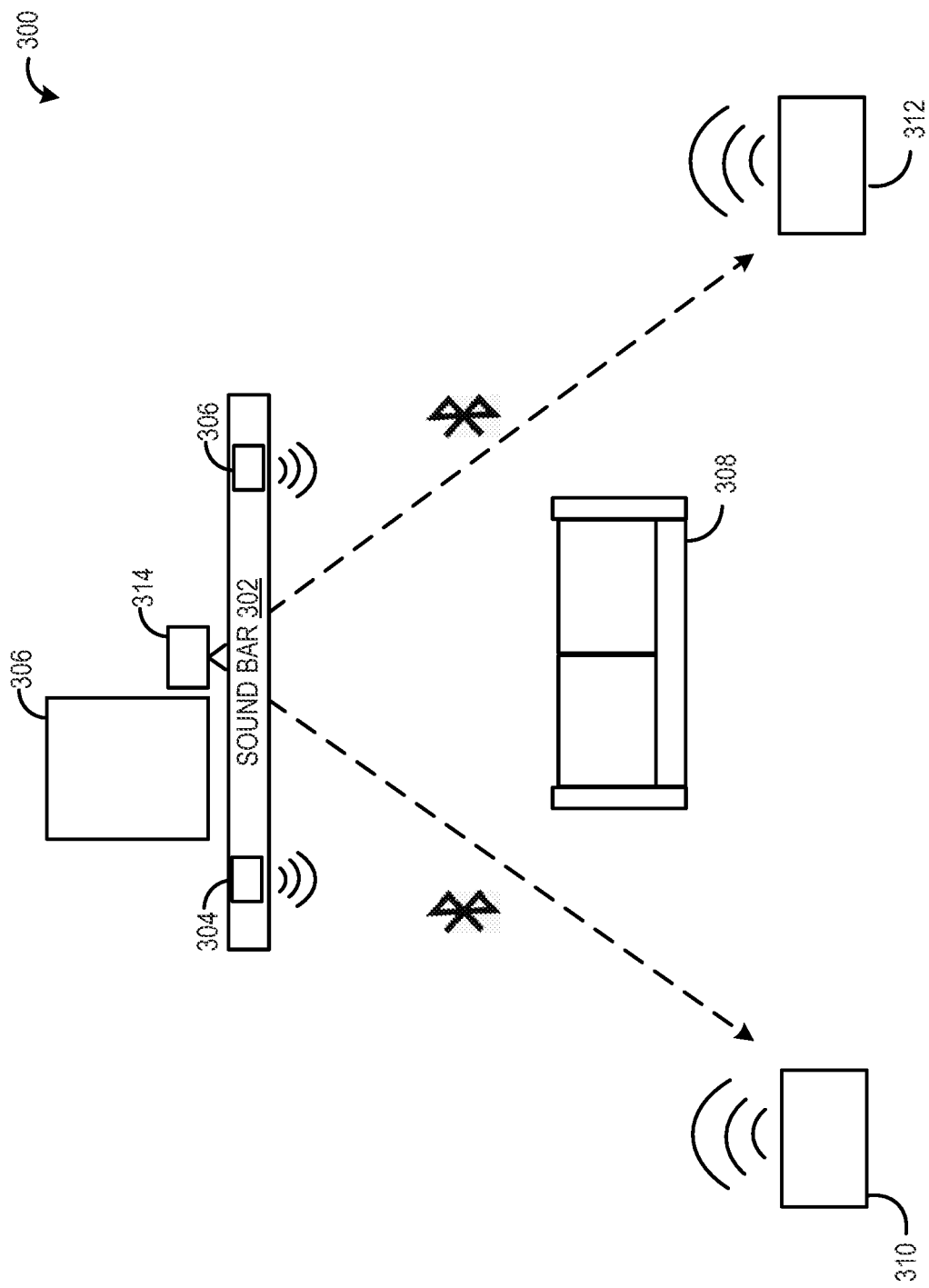
FIG. 3A is a schematic diagram of a home audio system using a Bluetooth® Classic or BR/EDR-based piconet in a first configuration, in accordance with one or more embodiments of the present disclosure.
Figure 3B:
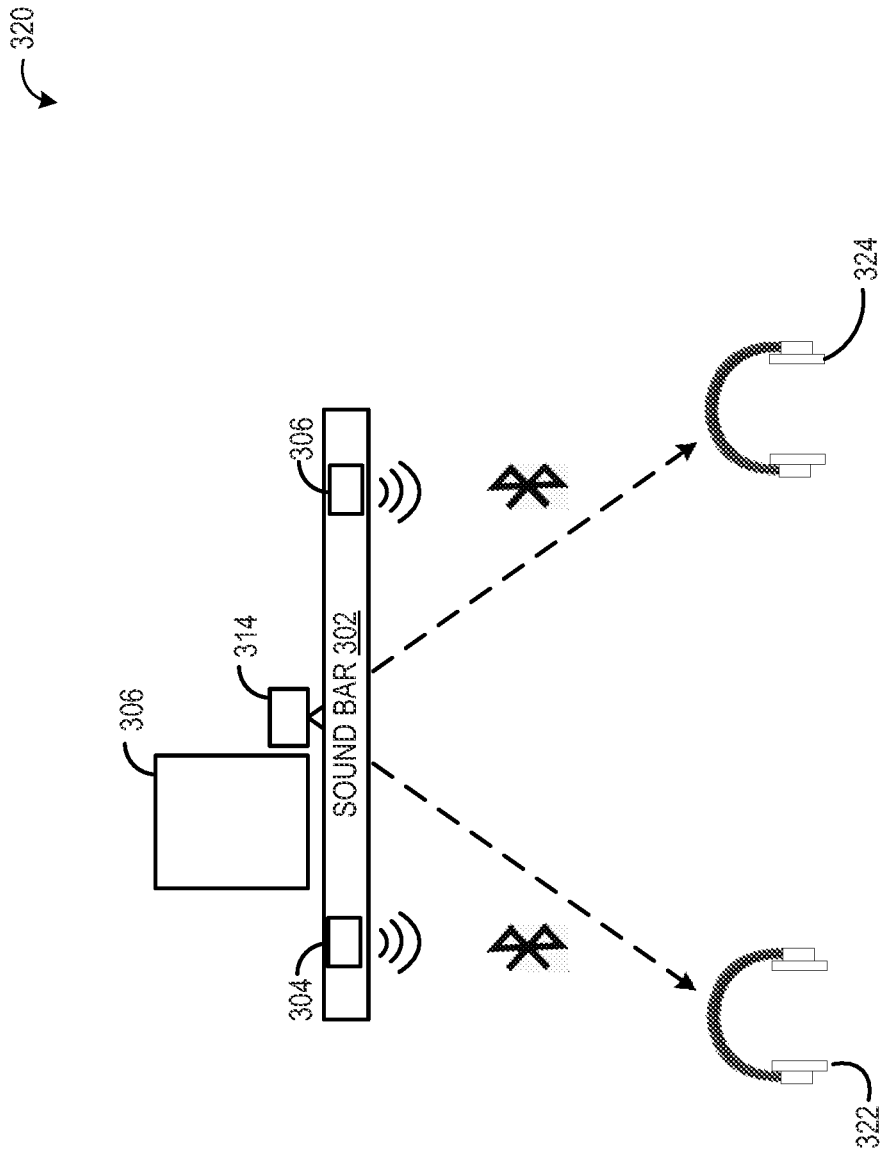
FIG. 3B is a schematic diagram of a home audio system using a Bluetooth® Classic or BR/EDR-based piconet in a second configuration, in accordance with one or more embodiments of the present disclosure.
Figure 3C:
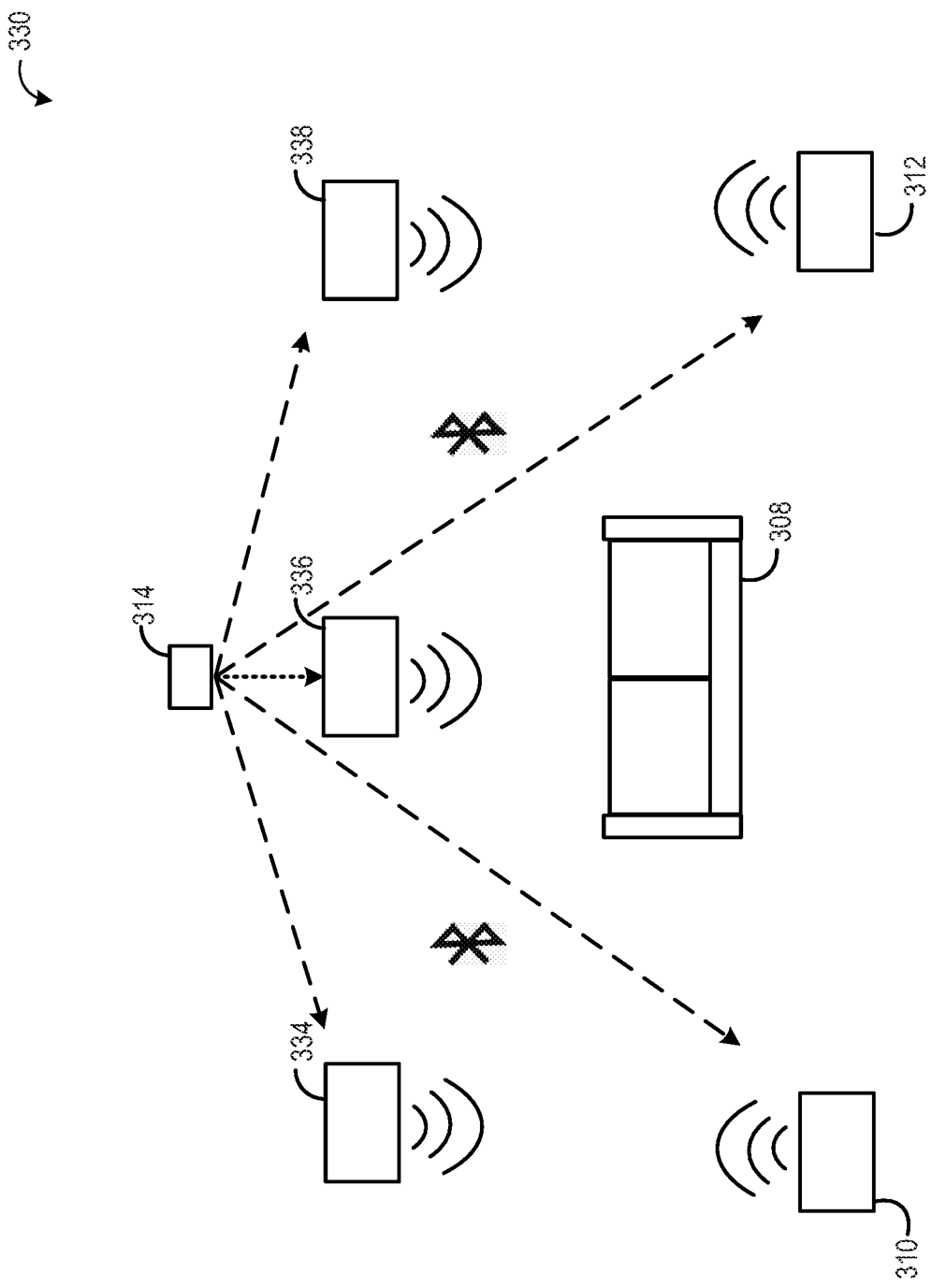
FIG. 3C is a schematic diagram of a home audio system using a Bluetooth® Classic or BR/EDR-based piconet in a third configuration, in accordance with one or more embodiments of the present disclosure.

Turning now to FIG. 2, an example audio subsystem 200 of an operating system (e.g., of a computational device) is shown. The audio subsystem 200 may be a general purpose, network-capable sound server that manages sound data in conjunction with the operating system. In some embodiments, the operating system may be a Unix-based operating system (e.g., Linux, a BSD distribution, Solaris, etc.), and the audio subsystem 200 may be a the PulseAudio sound server. The audio subsystem 200 may be substantially similar to audio subsystem 108 of FIG. 1A.

The audio subsystem 200 may include a controller 204, which may control operations of the audio subsystem 200. For example, the controller 204 may control or execute operations involving multiplexing, adjusting channel or sample information, directing an audio output to one or more listening devices, and so forth (in concert with a memory for containing executable instructions, such as the memories disclosed herein). Additionally, the controller 204 may packetize audio signals from audio content into a stream of packets, which may be transmitted to one or more wireless Bluetooth® devices (e.g., a wireless speaker, headphones, etc.) over a piconet for audio playback. Further, the controller 204 may carry out one or more other operations to prepare the audio content for transmission to the one or more wireless Bluetooth® devices, in accordance with one or more data profiles and/or protocols based on a Bluetooth® stack of the audio subsystem 200.

In some embodiments, a plurality of outputs of the audio subsystem 200 may be directed to a plurality of Bluetooth® devices, where the plurality of outputs carries a respectively corresponding plurality of audio signals. For example, the audio subsystem 200 may be part of an operating system of a home stereo system, and the controller 204 may generate a number of distinct outputs of the audio subsystem 200 which may be directed to an equal number of Bluetooth® enabled speakers. To accommodate a request for audio at the plurality of Bluetooth® devices, the controller 204 may create a plurality of audio transmission modules of the audio subsystem 200, such as an audio transmission module 220, an audio transmission module 230, an audio transmission module 240, and an audio transmission module 250. The audio transmission modules 220, 230, 240, and 250 may include a respectively corresponding plurality of digital audio encoder/decoders, such as a low-complexity subband codecs (SBCs) 222, 232, 242, and 252, respectively, where each of the plurality of audio transmission modules encodes digital audio content for a distinct audio signal using the corresponding SBC. For example, the audio transmission module 220 may use the SBC 222 to encode a first set of digital audio content for a first audio signal; the audio transmission module 230 may use the SBC 232 to encode a second set of digital audio content for a second audio signal, and so forth. In various embodiments, one or more of the sets of digital audio content may be the same.

In various embodiments, each distinct audio signal processed by each of the audio transmission modules 220, 230, 240, and 250 may be prepared from the same audio content or different audio content (e.g., from the same file, or different files, or the same or different audio streams from a network) to be transmitted wirelessly using a Bluetooth® Protocol Stack 260. The Bluetooth® Protocol Stack 260 is responsible for core Bluetooth® layers and protocol implementation including device discovery, service discovery, pairing, connection, etc. In one embodiment, the Bluetooth® Protocol Stack 260 may include, or may be, the BlueZ Bluetooth® protocol stack. In another embodiment, the Bluetooth® Protocol Stack 260 may include, or may be, the Fluoride Bluetooth® protocol stack.

In some embodiments, the Bluetooth® Protocol Stack 260 includes an A2DP 262. The A2DP 262 is a Bluetooth® profile that describes how a stereo audio signal may be transmitted in accordance with the Bluetooth® Classic Bluetooth® BR/EDR wireless standards. Each of the audio transmission modules 220, 230, 240, and 250 may use a distinct A2DP 262 corresponding with a distinct audio signal, which in turn corresponds with an SBC of the SBCs 222, 232, 242, and 252. (In various embodiments, a single audio signal may carry audio data corresponding to both left audio channel and a right audio channel.) The Bluetooth® Protocol Stack 260 may also include one or more Bluetooth® related protocols, such as an Audio/Video Distribution Transport Protocol (AVDTP) 264, and a Logical Link Control and Adaptation Layer Protocol (L2CAP) 266. The one or more Bluetooth® related protocols may be used by the audio transmission modules 220, 230, 240, and 250 to packetize the audio stereo signals, whereby different information may be associated with data packets in different layers of the Bluetooth® Protocol Stack 260.

In various embodiments, information carried by data packets may include a channel access code, a packet header, a payload header, and a payload, where the L2CAP, the AVDTP, and other protocols may be used to provide the information. For example, the L2CAP may be used in a data link layer of the Bluetooth® Protocol Stack 260 to include a logical link identifier in the payload header, a transport identifier in the packet header, and/or other information. The transport identifier may then be used by a receiving device to identify a respective audio signal that is directed to the receiving device for playback. In some embodiments, the transport identifier may be a Logical Transport Address. The AVDTP may be used to set up an audio stream between a transmitting device and a receiving device for based on the L2CAP. Thus, audio content accessed by an application layer of the Bluetooth® Protocol Stack 260 may be packetized in the data link layer (e.g., the L2CAP layer), before being passed to a baseband circuitry in a physical layer of the Bluetooth® Protocol Stack 260.

The Bluetooth® Protocol Stack 260 may include an HCI 270, which passes requests, commands, and events between upper layers of the Bluetooth® Protocol Stack 260 (e.g., the application layer, middleware layer, data link or link control layer) and the physical layer of the Bluetooth® Protocol Stack 260. In various embodiments, the physical layer may include, or may be, a BR/EDR component, and may be substantially similar to the BR/EDR component 112). The physical layer (and/or a baseband circuitry corresponding with the Bluetooth® Protocol Stack 260) may transmit one or more audio signals to one or more respectively corresponding receiving devices (e.g., the receiving devices 120-126 of the wireless audio system 100 of FIG. 1A).

Referring now to FIG. 3A, an example wireless audio system 300 is shown in a first configuration, including a sound bar 302 (e.g., a control audio device) of a home stereo system with two integrated front channel speakers 304 and 306. The wireless audio system 300 also includes a sub-woofer 306 and two Bluetooth® enabled wireless audio output devices, a speaker 310 and a speaker 312. In some examples, the sub-woofer 306 may be a Bluetooth® enabled wireless audio output device, while in other examples, the sub-woofer 306 may be a wired audio output device coupled to the sound bar 302.

In the first configuration, the speakers 310 and 312 are depicted as being positioned behind an ideal listening area 308. However, in other examples, the speakers 310 and 312 may be positioned at different locations or in any suitable speaker arrangement. For example, speakers 310 and 312 may be positioned in different locations for providing surround sound for a home entertainment system, and/or may be arranged to provide directed sound into one or more different or larger spaces. The speakers 310 and 312 may be configured to output different types or ranges of sounds (e.g., different ranges of frequencies are output by tweeters, sub-woofers, woofers, mid-range loudspeakers, full-range loud-speakers, etc.). Each of the speakers 310 and 312 may further include a processor (e.g., a hardware logic device) and a memory (e.g., a hardware storage device) for storing instructions executable by the processor to perform actions such as controlling data transfer between a transmitting device (e.g., the sound bar 302) and the speakers 310 and 312. For example, the speakers 310 and 312 may include host firmware that is able to process and respond to communicated packets received at the speakers 310 and 312 (e.g., the BR/EDR components 130 of the receiving devices 120-126 of FIG. 1A).

Instructions for controlling the speakers 310 and 312 may be provided by one or more control audio devices, such as the sound bar 302. For example, the sound bar 302 may be coupled to a Bluetooth® enabled network device 314, which may transmit one or more audio signals processed by the sound bar 302. In some embodiments, the Bluetooth® enabled network device 314 may include a transmitting device substantially similar to transmitting device 102 of FIG. 1A. The Bluetooth® enabled network device 314 may include a BR/EDR component (e.g., the BR/EDR component 152 of FIG. 1B) that allows the speakers 310 and 312 to engage in wireless communication with it, and may transmit network packets to the speakers 310 and 312.

Information for configuring the speakers 310 and 312 may include provisioning information to enable the speakers 310 and 312 to connect to a network (e.g., a piconet). The provisioning information may be sent via packages and/or packets, which are able to be read (e.g., after decryption, in examples where the packets are encrypted for security purposes), parsed, and/or processed by the speakers 310 and 312. The sound bar 302 may include a UI (e.g., the UI 107 of the transmitting device 102 of FIG. 1A) for presenting visual information to a user of the sound bar 302, and for receiving user input to the sound bar 302 via one or more buttons, knobs, or other similar controls of the sound bar 302.

Figure 3D:
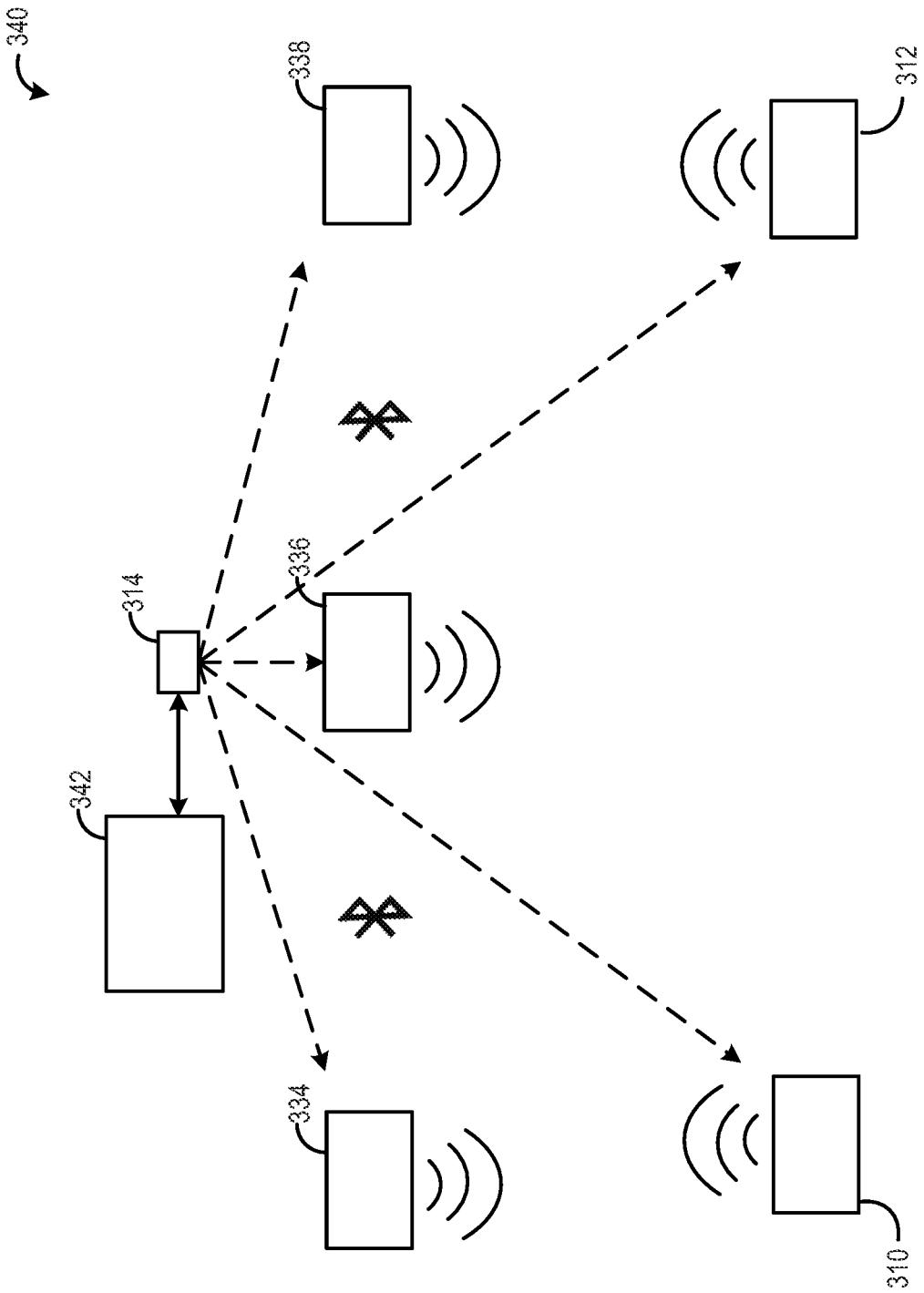
FIG. 3D is a schematic diagram of a portable audio system using a Bluetooth® Classic or BR/EDR-based piconet, in accordance with one or more embodiments of the present disclosure.
Figure 4A:
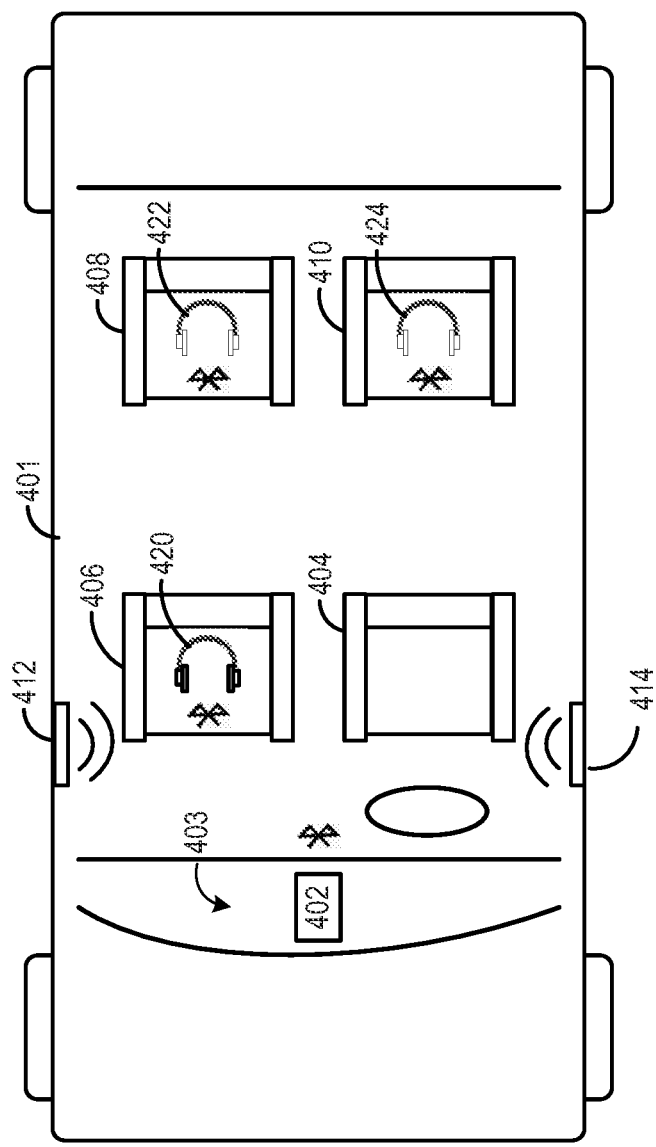
FIG. 4A is a schematic diagram of a vehicular audio system using a Bluetooth® Classic or BR/EDR-based piconet in a first configuration, in accordance with one or more embodiments of the present disclosure.
Figure 4B:
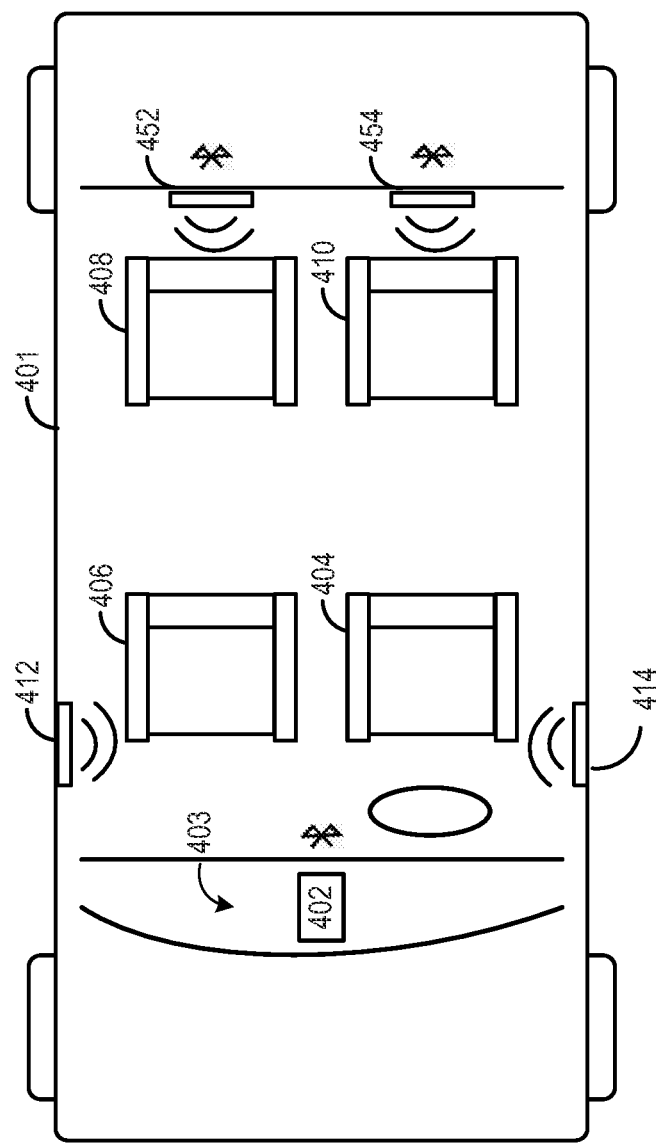
FIG. 4B is a schematic diagram of a vehicular audio system using a Bluetooth® Classic or BR/EDR-based piconet in a second configuration, in accordance with one or more embodiments of the present disclosure.

FIGS. 3B, 3C, and 3D show the wireless audio system 300 in alternative example configurations. In FIG. 3B, the wireless audio system 300 is shown in a second example configuration 320, where the wireless audio system 300 is in a privacy mode. In the privacy mode, the speakers 310 and 312 have been replaced by a first pair of headphones 322 and a second pair of headphones 324. For example, a first listener and a second listener may be listening to audio content streamed via the sound bar 302 via the speakers 310 and 312 of FIG. 3A, where the second set of listeners may wish to stop listening to the audio content (e.g., to go to bed, etc.) and the first set of listeners may wish to continue listening to the audio content. To listen to the audio content privately (e.g., without bothering the second set of listeners), the first set of listeners may request via the UI of the sound bar 302 to redirect a first audio signal transmitted from the sound bar 302 to the speaker 310 to the first pair of headphones 322, and to redirect a second audio signal transmitted from the sound bar 302 to the speaker 312 to the second pair of headphones 322.

In FIG. 3C, the wireless audio system 300 is shown in a third example configuration 330, where the front speakers 304 and 306 of the sound bar 302 and the subwoofer 306 have been replaced by a front left speaker 334, a front center speaker 336, and a front right speaker 338 as additional Bluetooth® enabled receiving devices (e.g., to create a 5.0 surround sound system), and the Bluetooth® enabled network device 314 is a device that does not have integrated speakers (e.g., a stereo receiver/amplifier, etc.). For example, the front left speaker 334 and the front right speaker 338 may transmit left and right channel signals, the front center speaker 336 may transmit a lower frequency signal (e.g., to function as a subwoofer), and the speakers 310 and 312 may transmit left and right surround sound channels. In some embodiments, the speakers 310 and 312 and the front left speaker 334, the front center speaker 336, and the front right speaker 338 are JBL Charge 4 standalone speakers.

FIG. 3D shows a fourth example configuration 340 of the wireless audio system 300, where a portable transmitting device 342 is used to transmit audio signals to the speakers 310 and 312 and the front left speaker 334, the front center speaker 336, and the front right speaker 338. For example, the portable transmitting device may be a boom box, or a smart phone, or a tablet, or any similar device capable of producing an audio signal. In some embodiments, the Bluetooth® enabled network device 314 is a Bluetooth® dongle connected to the portable transmitting device 342 via a USB port of the portable boom box 342.

FIG. 4A shows a wireless audio system of a vehicle 401 in a first configuration 400. The wireless audio system may include an onboard transmitting device 402 (which may substantially similar to the transmitting device 102 of the wireless audio system 100 of FIG. 1A), and may include, for example, a processor, a memory, a user interface, an audio subsystem, and/or a BR/EDR component with baseband circuitry configured to transmit audio and other data wirelessly in accordance with a revision of the Bluetooth® Classic (BR/EDR) core specification (e.g., substantially similar to the processor 104, memory 106, user interface 107, audio subsystem 108, and the BR/EDR component 112 of FIG. 1A). In some embodiments, the revision of the core specification is revision 2.0. In other embodiments, the revision of the core specification is revision 4.0. In some embodiments, the onboard transmitting device 402 is integrated into a dashboard 403 of the vehicle 401.

The vehicle 401 may include the dashboard 403, a driver seat 404, a passenger seat 406, a passenger seat 408, and a passenger seat 410. In other examples, the vehicle may include more passenger seats or fewer passenger seats. Additionally, the vehicle 401 may include a right integrated speaker 412 and a left integrated speaker 414, which may be arranged in a right door and a left door, respectively, of the vehicle 401 (e.g., a right-front door and a left-front door). In some embodiments, the right integrated speaker 412 and the left integrated speaker 414 are speakers that are electronically coupled via a wired connection to the onboard transmitting device 402, whereby an audio file selected by a driver (or a passenger) of the vehicle 401 (e.g., via the user interface) may be listened to via the right integrated speaker 412 and the left integrated speaker 414. Specifically, a controller of an audio subsystem (e.g., substantially similar to the controller 204 of the audio subsystem 200 of FIG. 2) may process an audio signal, the audio signal including right channel information and left channel information, where the right channel information is received and played at the right integrated speaker and the left channel information is received and played at the left integrated speaker.

In addition, the onboard wireless transmitting device 402 may wirelessly transmit, via Bluetooth® connections, one or more audio signals to one or more receiving devices within the vehicle. For example, a first passenger in the passenger seat 406 may have a first set of headphones 420, a second passenger in the passenger seat 408 may have a second set of headphones 422, and a third passenger in the passenger seat 410 may have a third set of headphones 424. In one example, the first passenger, the second passenger, and the third passenger all wish to listen to a first set of audio content. When the first set of headphones 420, the second set of headphones 422, and the third set of headphones 424 are turned on, the wireless transmitter 402 may automatically detect the first set of headphones 420, the second set of headphones 422, and the third set of headphones 424. A passenger may subsequently select the first set of headphones 420, the second set of headphones 422, and the third set of headphones 424 to receive the first set of audio content via the user interface of the transmitting device 402.

To wirelessly transmit the first set of audio content to each of the first passenger, the second passenger, and the third passenger, the controller of the audio subsystem may create a first audio transmission module for the first passenger based on a first A2DP profile, a second audio transmission module for the second passenger based on a second A2DP profile, and a third audio transmission module for the third passenger based on a third A2DP profile. The controller may then process a first audio signal in the first audio transmission module using the first A2DP profile, a second audio signal in the second audio transmission module using the second A2DP profile, and a third audio signal in the third audio transmission module using the third A2DP profile. Via AVDTP, L2CAP, and/or other protocols of a Bluetooth® protocol stack (e.g., substantially similar to the Bluetooth® protocol stack 260 of FIG. 2), the first audio signal may be packetized into a stream of audio packets in the first audio transmission module, where each packet is assigned a transport identifier specifying that the packet is to be received by the first set of headphones of the first passenger. Similarly, the second audio signal may be packetized into a stream of audio packets in the second audio transmission module, where each packet is assigned a transport identifier specifying that the packet is to be received by the second set of headphones of the second passenger, and the third audio signal may be packetized into a stream of audio packets in the third audio transmission module, where each packet is assigned a transport identifier specifying that the packet is to be received by the third set of headphones of the third passenger.

In another example, the first passenger wishes to listen to a first set of audio content, and the second passenger and the third passenger wish to listen to a second set of audio content, where the second set of audio content is different from the first set of audio content. To wirelessly transmit the first set of audio content to the first passenger, and wirelessly transmit the second set of audio content to the second passenger and the third passenger, the controller of the audio subsystem may process a first audio signal based on the first set of audio content in the first audio transmission module using the first A2DP profile, a second audio signal based on the second set of audio content in the second audio transmission module using the second A2DP profile, and a third audio signal based on the second set of audio content in the third audio transmission module using the third A2DP profile. As in the first example, the first audio signal, second audio signal, and third audio signal may be packetized into streams of audio packets in respective audio transmission modules, where each packet is assigned a transport identifier specifying the receiving device (e.g., the first set of headphones, the second set of headphones, or the third set of headphones) that will receive the packet. In some embodiments, the first audio signal, second audio signal, and third audio signal may include right and left channel signals, which may be directed to a right and left headphone, respectively. In this way, different audio signals may be processed, based on the same audio content or different audio content, and may then be transmitted to a plurality of users of the wireless audio system of the vehicle 401.

FIG. 4B shows the wireless audio system of the vehicle 401 in a second configuration 450. In the second configuration 450, the wireless audio system includes two additional Bluetooth® enabled speakers arranged at a back end of a cabin of the vehicle 401, comprising a right channel speaker 452 and a left channel speaker 454. In some embodiments, the right channel speaker 452 may be positioned behind the passenger seat 408 and the left channel speaker 454 may be positioned behind the passenger seat 410. In other embodiments, the right channel speaker 452 and/or the left channel speaker 454 may be arranged at different positions, such as in a rear passenger door of the vehicle 401, or on a back side of the driver seat 404 and/or the passenger seat 406, or mounted on a ceiling of the vehicle 401, or somewhere else within the cabin 401. In some embodiments, the right channel speaker 452 and/or the left channel speaker 454 may be integrated into and/or electrically coupled to the vehicle 401, while in other embodiments, the right channel speaker 452 and/or the left channel speaker 454 might not be integrated into the vehicle and/or electrically coupled to the vehicle 401, and the right channel speaker 452 and/or the left channel speaker 454 might instead be portable speakers that may be positioned freely in any of a plurality of arrangements within or outside the vehicle 401. It should be appreciated that the examples provided herein are for illustrative purposes, and a greater or lesser number of speakers, or different types of speakers, may be included in the wireless audio system without departing from the scope of this disclosure.

As another example, the driver and a first passenger in the passenger seat 406 may wish to listen to a first set of audio content, while a second passenger and a third passenger may wish to listen to a second set of audio content, where the second set of audio content is different from the first set of audio content. For example, parents of a family sitting in front seats of the vehicle 401 may wish to listen to music, while children of the family may wish to listen to an audio track of a video being played at rear seats (e.g., the passenger seats 408 and 410) of the vehicle, for example, on a screen mounted on a ceiling of the vehicle 401. In the second configuration 450, the parents may listen to the first set of audio content via the wired right integrated speaker 412 and left integrated speaker 414, while the children may listen to the second set of audio content via the wireless right channel speaker 452 and left channel speaker 454. To transmit the first set of audio content via right integrated speaker 412 and left integrated speaker 414, the controller of the audio subsystem may process a first audio signal with left and right channel signals based on the first set of audio content for wired transmission to the wired right integrated speaker 412 and left integrated speaker 414. To transmit the second set of audio content via the wireless right channel speaker 452 and left channel speaker 454, the controller of the audio subsystem may create a first audio transmission module using a first A2DP profile, and a second audio transmission module using a second A2DP profile. The controller may process a second audio signal based on the second set of audio content in the first audio transmission module using the first A2DP profile, and a second audio signal based on the second set of audio content in the second audio transmission module using the second A2DP profile. As in the examples of FIG. 4A, the first audio signal and second audio signal may be packetized into streams of audio packets in the respective audio transmission modules, where each packet is assigned a transport identifier specifying the receiving device (e.g., wireless right channel speaker 452 or the left channel speaker 454) that will receive the packet.

Figure 5:
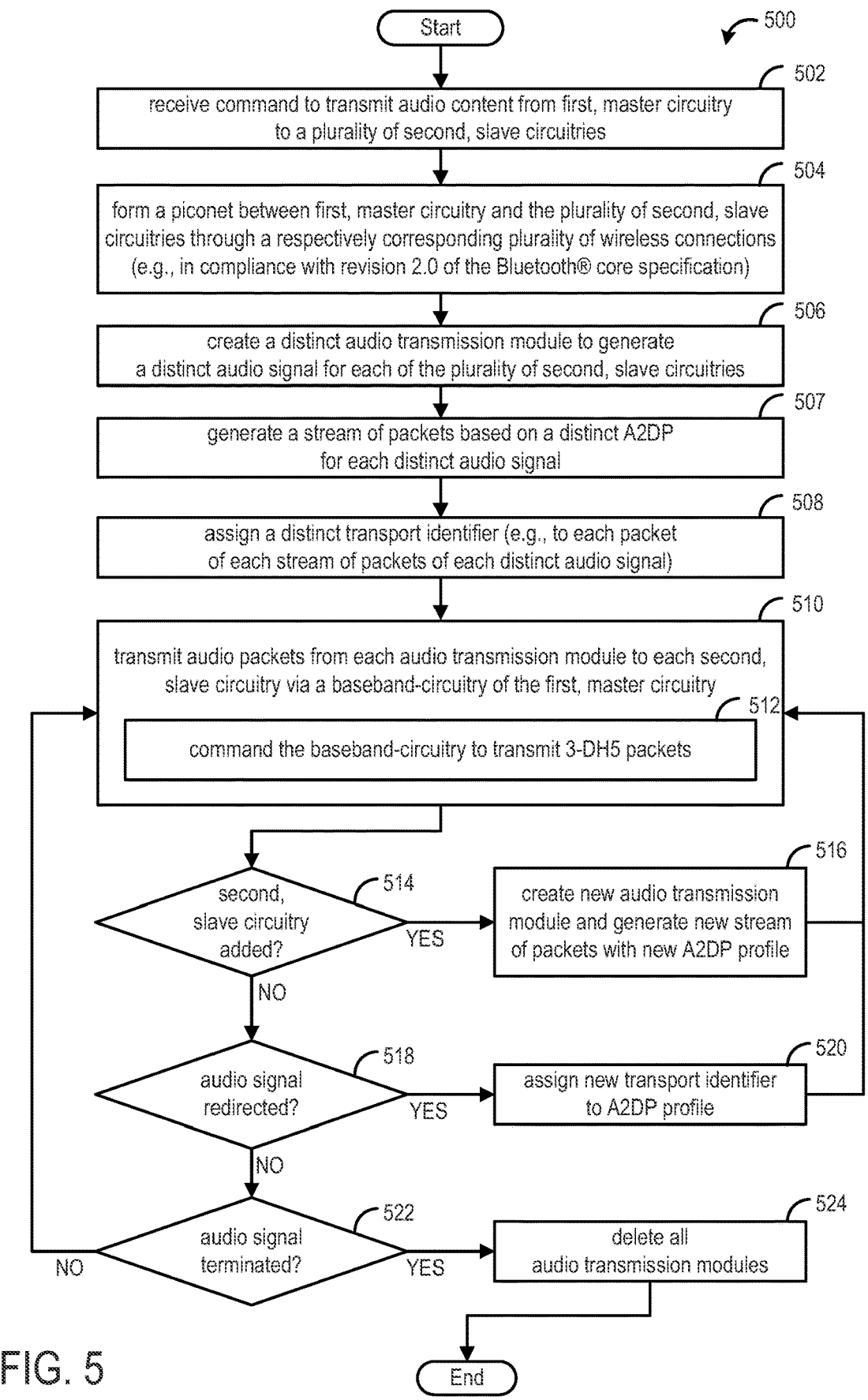
FIG. 5 is a flowchart illustrating an exemplary procedure for transmitting a plurality of audio signals to a plurality of Bluetooth® Classic or BR/EDR-enabled devices within a piconet, in accordance with one or more embodiments of the present disclosure.

Referring now to FIG. 5, a flowchart is shown illustrating an exemplary method 500 for transmitting a plurality of audio signals to a plurality of Bluetooth® enabled devices within a piconet, in compliance with revision 2.0 of the BR/EDR core specification. The method 500 may be executed by a controller of an audio subsystem of a transmitting device, such as the controller 204 of the audio subsystem 200 of FIG. 2, in conjunction with a processor of the transmitting device, such as the processor 104 of the transmitting device 102 (e.g., and the audio subsystem 108) of FIG. 1A.

At 502, method 500 includes receiving a command to transmit audio content wirelessly from a first master circuitry (e.g., a Bluetooth® enabled transmitting device) to a plurality of second, slave circuitries (e.g., receiving devices). In some embodiments, the command is initiated by a user of a wireless audio system (e.g., the wireless audio system 100 of FIG. 1A) via a UI of the wireless audio system (the UI 107 of the transmitting device 102 of the wireless audio system 100). For example, the user may open a music application on the transmitting device, and select an audio file, an audio stream, or other audio content to play on one or more receiving devices of the plurality of second slave circuitries.

At 504, method 500 includes forming a piconet between a master circuitry and a plurality of slave circuitries through a respectively corresponding plurality of wireless connections in compliance with BR/EDR provisions of a revision of a Bluetooth® core specification (e.g., revision 2.0, revision 4.0, etc.). In some embodiments, a Bluetooth® pairing scheme may be initiated when the user turns on and selects the plurality of second, slave circuitries for audio playback (e.g., via the UI of the wireless audio system). For example, the user may turn on a first Bluetooth® enabled speaker, a second Bluetooth® enabled speaker, a third Bluetooth® enabled speaker, and a fourth Bluetooth® enabled speaker arranged within a threshold distance of a transmitting device. As each of the first, second, third, and fourth Bluetooth® enabled speakers are turned on, the transmitting device may detect the first, second, third, and fourth Bluetooth® enabled speakers, whereby the first, second, third, and fourth Bluetooth® enabled speakers may appear in the UI as a list of devices to which the user may connect. When the user requests the audio content and selects the first, second, third, and fourth Bluetooth® enabled speakers for audio playback, the first, master circuitry may transmit a connection request to the first, second, third, and fourth Bluetooth® enabled speakers. In response to the connection requests, each of the first, second, third, and fourth Bluetooth® enabled speakers may pair with the transmitting device (e.g., by exchanging one or more passkeys to establish connections between the transmitting device and each of the first, second, third, and fourth Bluetooth® enabled speakers). Once the connection has been established between the transmitting device and each of the first, second, third, and fourth Bluetooth® enabled speakers, data (e.g., the audio content) may be transmitted from the transmitting device to each of the first, second, third, and fourth Bluetooth® enabled speakers.

At 506, method 500 includes creating a distinct audio transmission module to process a distinct audio signal for each of the plurality of second, slave circuitries. For example, if the user requests audio playback from the first, second, third, and fourth Bluetooth® enabled speakers described above, the audio subsystem of the transmitting device may create a first audio transmission module to send a first audio signal to the first Bluetooth® enabled speaker, a second audio transmission module to send a second audio signal to the second Bluetooth® enabled speaker, a third audio transmission module to send a third audio signal to the third Bluetooth® enabled speaker, and a fourth audio transmission module to send a fourth audio signal to the fourth Bluetooth® enabled speaker. In some embodiments, the first, second, third, and fourth audio signals may correspond to various portions of the same audio content (e.g., as in the surround sound example above). In another example, the first, second, third, and fourth audio signals may correspond to portions of different audio content. For example, the first and second audio signals may correspond to a first audio file, and the third and fourth audio signals may correspond to a second audio file (e.g., where a first user is listening to the first audio file on a first set of headphones, and a second user is listening to the second audio file on a second set of headphones).

At 507, method 500 includes generating a stream of packets based on a distinct A2DP for each distinct audio signal. For example, the first audio transmission module may generate a first stream of packets that encodes the first audio signal, the second audio transmission module may generate a second stream of packets that encodes the second audio signal, the third audio transmission module may generate a third stream of packets that encodes the third audio signal, and the fourth audio transmission module may generate a fourth stream of packets that encodes the fourth audio signal. In some embodiments, the first, second, third and fourth audio signals are encoded using a low-complexity SBC, such as the SBC 222, 232, 242, and 252 of the audio subsystem 200 of FIG. 2.

At 508, method 500 includes assigning a distinct transport identifier to each packet of each stream of packets of each distinct audio signal. For example, the transport identifier may be attached to a packet header of each packet using the L2CAP protocol. In some embodiments, the transport identifier identifies a logical address of a corresponding second, slave circuitry, where the logical address is used by the corresponding second, slave circuitry (e.g., speaker) to identify the packets to be received by the corresponding second, slave circuitry. For example, the first audio transmission module may assign a first logical address to the first Bluetooth® enabled speaker, the second audio transmission module may assign a second logical address to the second Bluetooth® enabled speaker, the third audio transmission module may assign a third logical address to the third Bluetooth® enabled speaker, and the fourth audio transmission module may assign a fourth logical address to the fourth Bluetooth® enabled speaker. The first logical address may be attached to various packets of the first stream of packets so the first Bluetooth® enabled speaker can receive the first audio signal, the second logical address may be attached to various packets of the second stream of packets so the second Bluetooth® enabled speaker can receive the second audio signal, the third logical address may be attached to various packets of the third stream of packets so the third Bluetooth® enabled speaker can receive the third audio signal, and the fourth logical address may be attached to various packets of the fourth stream of packets so the fourth Bluetooth® enabled speaker can receive the fourth audio signal.

At 510, method 500 includes transmitting the streams of audio packets from each audio transmission module to each second, slave circuitry via a baseband-circuitry of the first, master circuitry (e.g., the BR/EDR component 112 of the transmitting device 102 of FIG. 1A). In some embodiments, the streams of packets carrying audio data are passed to the baseband-circuitry via an HCI, such as the HCI 110 of FIG. 1A. Thus, the baseband circuitry may concurrently transmit the first audio signal to the first Bluetooth® enabled speaker via the first stream of packets, the second audio signal to the second Bluetooth® enabled speaker via the second stream of packets, the third audio signal to the third Bluetooth® enabled speaker via the third stream of packets, and the fourth audio signal to the fourth Bluetooth® enabled speaker via the fourth stream of packets.

At 512, transmitting the stream of packets to each second, slave circuitry includes commanding the baseband-circuitry to transmit 3-DH5 packets. Each packet of the first, second, third, and fourth streams of packets may include information defined by the Asynchronous Connection-Less (ACL) communications protocol, such as an access code, a packet header, a payload, and a cyclic redundancy check (CRC). Although the maximum data rate (e.g., bandwidth) for BR/EDR is 3 Mbps, BR/EDR may use one of several different types of packets, with different data rates. For example, a first packet type 2-DH3 using 3 slots may have a first A2DP payload bitrate (e.g., up to 749 kbps), a second packet type 3-DH3 using 3 slots may have a second A2DP payload bitrate (e.g., up to 1143 kbps), a third packet type 2-DH5 using 5 slots may have a third A2DP payload bitrate (e.g., up to 1414 kbps), and a fourth packet type 3-DH5 using 5 slots may have a fourth A2DP payload bitrate (e.g., up to 2144 kbps).

Under some conditions, the transmitting device 102 may command that one or more packet types with higher payload bitrate (e.g., 3-DH5 packets) be used. By commanding the baseband-circuitry to transmit packet types with a higher payload bitrate, a quality of each audio signal of the plurality of audio signals may be increased, which may in turn advantageously facilitate the establishment and/or maintenance of a desired or target audio quality.

As an example, a maximum bandwidth available in BR/EDR may be 2.144 Mbps. A bitrate for sending 3-DH5 packets may depend on a plurality of parameters of an SBC encoding, including a sampling rate, a channel mode, a number of blocks in a frame, a number of subbands, a bitpool setting, etc. In one example, the sampling rate is 44100 Hz, the channel mode is joint stereo, the number of blocks in frame is 16, the number of subbands is 8, and the bitpool is set at 53, whereby the corresponding bitrate of a 3-DH5 packet is 328 kbps. At a bitrate of 328 kbps, up to 6 audio signals may be transmitted concurrently, where each audio signal sends 3-DH5 packets (e.g., 6*328=1.968 Mbps, which is less than 2.144 Mbps). Further, in some embodiments, the SBC parameters may be adjusted to decrease the bitrate of the 3-DH5 to allow for a greater number of concurrent audio signals. For example, audio signals for surround sound may include SBC parameters that are adjusted so that the 3-DH5 packets have a bitrate that is lower than a bitrate used for front speakers. By lowering the bitrate of 3-DH5 packets for surround sound audio signals, a greater number of concurrent audio signals may be generated without exceeding the maximum bandwidth of 2.144 Mbps. In one example, the audio bitrate may be allowed to decrease to a minimum bitrate (e.g., 75 kbps) without significantly reducing a quality of the audio signals.

At 514, method 500 includes determining whether a second, slave circuitry has been added to the piconet. If at 514 it is determined that a second slave circuitry has been added to the piconet, method 500 proceeds to 516. At 516, method 500 includes creating a new audio transmission module and generating a new stream of packets with a new A2DP profile, and method 500 proceeds back to 510. If at 514 it is determined that a second, slave circuitry has not been added to the piconet, method 500 proceeds to 518.

At 518, method 500 includes determining whether an audio signal processed by an audio transmission module has been redirected to a different receiving device. For example, the user of the wireless audio system may be listening to the audio content through a first set of second, slave circuitries (e.g., a first pair of speakers), and the user may wish to redirect the audio content to a second set of second, slave circuitries (e.g., a second pair of speakers, headphones, etc.), and not listen to the audio content on the first set of second, slave circuitries.

If it is determined at 518 that an audio signal processed by an audio transmission module has been redirected to a different receiving device, method 500 proceeds to 520. At 520, method 500 includes assigning a new transport identifier to the A2DP associated with the audio signal, after which method 500 proceeds back to 510. If at 518 it is determined that an audio signal processed by an audio transmission module has not been redirected to a different receiving device, method 500 proceeds to 522. At 522, method 500 includes deleting all active audio transmission modules, and method 500 ends.

Thus, by creating a plurality of modules in an audio subsystem of an operating system within the Bluetooth® stack, where each module of the plurality of modules is used to connect to a distinct Bluetooth® device via a distinct transport identifier and a distinct A2DP profile, a plurality of audio signals may be processed and transmitted to different users of a sound system via a plurality of Bluetooth® enabled devices. In this way, a single transmitting device in a wireless audio system may deliver audio content to a plurality of receiving devices. Further, different audio content may be delivered to the plurality of receiving devices by the single transmitting device, whereby different users with different listening devices may listen to different audio content.

Additionally, a packet type transmitted by the transmitting device may be controlled based on a desired bitrate, responsive to a number of audio signals processed by the audio subsystem, where a baseband circuitry of the transmitting device may be commanded to send packet types with a high A2DP payload bitrate. If additional signals are requested to be transmitted, the bitrate of the packet type may be reduced based on an available bandwidth. By creating additional A2DP profiles on demand to facilitate streaming audio to additional listening environments, a flexibility and customization of the wireless audio system may be increased without compromising audio quality, leading to an improved listening experience and increased user satisfaction.

The disclosure also provides support for a method comprising forming, with a first circuitry, a piconet with a plurality of second circuitries through a respectively corresponding plurality of point-to-point wireless connections, and generating, from the first circuitry, a plurality of streams of packets respectively corresponding to the plurality of point-to-point wireless connections, wherein the plurality of streams of packets respectively correspond to a plurality of distinct transport identifiers, wherein the plurality of streams of packets carry audio data for different audio channels, and wherein the plurality of streams of packets are for Basic Rate/Enhanced Data Rate (BR/EDR) transmission in compliance with a revision of the Bluetooth® core specification. In a first example of the method, the plurality of distinct transport identifiers are logical transport addresses. In a second example of the method, optionally including the first example, the plurality of streams of packets are generated for a respectively corresponding plurality of Advanced Audio Distribution Profiles (A2DPs) implemented in an audio subsystem of an operating system. In a third example of the method, optionally including one or both of the first and second examples, the audio subsystem includes a sound server. In a fourth example of the method, optionally including one or more or each of the first through third examples, the plurality of streams of packets are generated for transmission through a baseband-circuitry portion of the first circuitry. In a fifth example of the method, optionally including one or more or each of the first through fourth examples, the plurality of streams of packets are for BR/EDR transmission in compliance with at least revision 2.0 of the Bluetooth® core specification. In a sixth example of the method, optionally including one or more or each of the first through fifth examples, the first circuitry is part of a master device compliant with the revision of the Bluetooth® core specification, and wherein the plurality of second circuitries are parts of a respectively corresponding plurality of slave devices compliant with the revision of the Bluetooth® core specification. In a seventh example of the method, optionally including one or more or each of the first through sixth examples, a controller of the first circuitry controls a packet type transmitted by the baseband-circuitry portion of the first circuitry based on a desired bitrate, responsive to a number of distinct audio signals generated by the first circuitry. In an eighth example of the method, optionally including one or more or each of the first through seventh examples, a controller of the first circuitry commands the baseband-circuitry portion of the first circuitry to transmit the plurality of streams of packets as 3-DH5 packets. In a ninth example of the method, optionally including one or more or each of the first through eighth examples, the number of distinct audio signals generated by the first circuitry depends on a bitrate of the 3-DH5 packets and an amount of available bandwidth. In a tenth example of the method, optionally including one or more or each of the first through ninth examples, the method further comprises, responsive to a demand for transmitting an additional audio signal when an amount of available bandwidth is insufficient for transmitting the additional audio signal, lowering a bitrate of one or more of the streams of packets to a bitrate no lower than 75 kbps.

The disclosure also provides support for a method of supporting a plurality of distinct audio signals, the method comprising: initializing a plurality of point-to-point wireless communication links between a master circuitry and a respectively corresponding plurality of slave circuitries, and generating a plurality of streams of packets respectively corresponding with the plurality of point-to-point wireless communication links for transmission through the master circuitry, wherein the plurality of streams of packets carry distinct sets of audio data, and wherein the plurality of streams of packets respectively correspond with a plurality of audio distribution profiles implemented in an audio subsystem of an operating system. In a first example of the method, the audio subsystem includes a sound server. In a second example of the method, optionally including the first example, the master circuitry generates the plurality of streams of packets in compliance with Basic Rate/Enhanced Data Rate (BR/EDR) transmission per at least revision 2.0 of the Bluetooth® core specification, and wherein the plurality of slave circuitries process the respectively corresponding plurality of streams of packets in compliance with BR/EDR transmission per at least revision 2.0 of the Bluetooth® core specification. In a third example of the method, optionally including one or both of the first and second examples, the plurality of streams of packets respectively correspond with a plurality of logical transport addresses. In a fourth example of the method, optionally including one or more or each of the first through third examples, the master circuitry comprises a baseband circuitry operable to generate packets, and wherein the plurality of slave circuitries comprise baseband circuitries operable to process packets. In a fifth example of the method, optionally including one or more or each of the first through fourth examples, the plurality of audio distribution profiles are distinct Advanced Audio Distribution Profiles (A2DPs).

The disclosure also provides support for a system for simultaneously supporting a plurality of distinct audio signals in a piconet, comprising: a first circuitry operable to transmit packets in compliance with Basic Rate/Enhanced Data Rate (BR/EDR) transmission per a revision of the Bluetooth® core specification, a plurality of second circuitries operable to receive packets in compliance with BR/EDR transmission per a revision of the Bluetooth® core specification, and one or more processors having executable instructions stored in a non-transitory memory that, when executed, cause the one or more processors to: form a plurality of wireless connections between the second circuitries and the first circuitry, associate the second circuitries with a respectively corresponding plurality of distinct logical transport addresses, and generate a plurality of streams of packets carrying distinct sets of audio data, for transmission through the first circuitry and processing through the plurality of second circuitries. In a first example of the system, the plurality of streams of packets respectively correspond with a plurality of audio distribution profiles implemented in an audio subsystem of an operating system. In a second example of the system, optionally including the first example, the plurality of audio distribution profiles are distinct Advanced Audio Distribution Profiles (A2DPs) of a unix-based operating system distribution, and the audio subsystem includes a sound server.

The technical effect of creating a plurality of audio subsystem modules to process a respectively corresponding plurality of audio signals, each audio signal with a distinct A2DP profile, and controlling a packet type of a stream of packets of each audio signal, is that the same or different audio content may be concurrently transmitted from a single transmitting master circuitry to a plurality of receiving slave circuitries while maintaining audio quality above a threshold quality.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the embodiments described above with respect to FIGS. 1-5. The methods may be performed by executing stored instructions with one or more logic devices (e.g., processors) in combination with one or more hardware elements, such as storage devices, memory, hardware network interfaces/antennas, switches, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method comprising:
    forming, with a first circuitry, a piconet with a plurality of second circuitries through a respectively corresponding plurality of point-to-point wireless connections; and
    generating, from the first circuitry, a plurality of streams of packets respectively corresponding to the plurality of point-to-point wireless connections,
    wherein the plurality of streams of packets respectively correspond to a plurality of distinct transport identifiers in headers of the streams of packets, and a Logical Link Control and Adaptation Layer Protocol (L2CAP) in compliance with a revision of the Bluetooth core specification is used to include the transport identifiers in the headers of the streams of packets;
    wherein the plurality of streams of packets carry audio data for different audio channels; and wherein the plurality of streams of packets are for Basic Rate/Enhanced Data Rate (BR/EDR) transmission in compliance with the revision of the Bluetooth core specification.

2. The method of claim 1, wherein the plurality of distinct transport identifiers are logical transport addresses.

3. The method of claim 1, wherein the plurality of streams of packets are generated for a respectively corresponding plurality of Advanced Audio Distribution Profiles (A2DPs) implemented in an audio subsystem of an operating system.

4. The method of claim 3, wherein the audio subsystem includes a sound server.

5. The method of claim 1, wherein the plurality of streams of packets are generated for transmission through a baseband-circuitry portion of the first circuitry.

6. The method of claim 5, wherein a controller of the first circuitry controls a packet type transmitted by the baseband-circuitry portion of the first circuitry based on a desired bitrate, responsive to a number of distinct audio signals generated by the first circuitry.

7. The method of claim 6, wherein a controller of the first circuitry commands the baseband-circuitry portion of the first circuitry to transmit the plurality of streams of packets as 3-DH5 packets.

8. The method of claim 7, wherein the number of distinct audio signals generated by the first circuitry depends on a bitrate of the 3-DH5 packets and an amount of available bandwidth.

9. The method of claim 8, further comprising, responsive to a demand for transmitting an additional audio signal when an amount of available bandwidth is insufficient for transmitting the additional audio signal, lowering a bitrate of one or more of the streams of packets to a bitrate no lower than 75 kbps.

10. The method of claim 1, wherein the plurality of streams of packets are for BR/EDR transmission to the corresponding plurality of second circuitries, via the plurality of distinct transport identifiers and a plurality of distinct Advanced Audio Distribution Profiles (A2DPs), in compliance with at least revision 2.0 of the Bluetooth core specification.

11. The method of claim 1, wherein the first circuitry is part of a master device compliant with the revision of the Bluetooth core specification; and wherein the plurality of second circuitries are parts of a respectively corresponding plurality of slave devices compliant with the revision of the Bluetooth core specification.

12. A method of supporting a plurality of distinct audio signals, the method comprising:
  initializing a plurality of point-to-point wireless communication links between a master circuitry and a respectively corresponding plurality of slave circuitries; and
  generating a plurality of streams of packets respectively corresponding with the plurality of point-to-point wireless communication links for transmission through the master circuitry,
  wherein the plurality of streams of packets carry distinct sets of audio data;
  wherein the plurality of streams of packets respectively correspond with a plurality of distinct transport identifiers in corresponding headers of the plurality of streams of packets, the plurality of distinct transport identifiers being included in the corresponding headers by a Logic Link Control and Adaptation Layer Protocol (L2CAP) in compliance with the revision of the Bluetooth core specification;
  wherein the plurality of streams of packets respectively correspond with a plurality of audio distribution profiles implemented in an audio subsystem of an operating system; and
  wherein the plurality of audio distribution profiles are distinct Advanced Audio Distribution Profiles (A2DPs).

13. The method of claim 12, wherein the audio subsystem includes a sound server.

14. The method of claim 13, wherein the sound server is a PulseAudio sound server.

15. The method of claim 12, wherein the master circuitry generates the plurality of streams of packets in compliance with Basic Rate/Enhanced Data Rate (BR/EDR) transmission per at least revision 2.0 of the Bluetooth core specification; and wherein the plurality of slave circuitries process the respectively corresponding plurality of streams of packets in compliance with BR/EDR transmission per at least revision 2.0 of the Bluetooth core specification.

16. The method of claim 15, wherein the plurality of distinct transport identifiers are logical transport addresses.

17. The method of claim 15, wherein the master circuitry comprises a baseband circuitry operable to generate packets; and wherein the plurality of slave circuitries comprise baseband circuitries operable to process packets.

18. A system for simultaneously supporting a plurality of distinct audio signals in a piconet, comprising:
  a first circuitry operable to transmit packets in compliance with Basic Rate/Enhanced Data Rate (BR/EDR) transmission per a revision of the Bluetooth core specification;
  a plurality of second circuitries operable to receive packets in compliance with BR/EDR transmission per a revision of the Bluetooth core specification; and
  one or more processors having executable instructions stored in a non-transitory memory that, when executed, cause the one or more processors to:
    form a plurality of wireless connections between the second circuitries and the first circuitry;
    associate the second circuitries with a respectively corresponding plurality of distinct logical transport addresses; and
    generate a plurality of streams of packets carrying distinct sets of audio data, for transmission through the first circuitry and processing through the plurality of second circuitries,
    wherein the plurality of distinct logical transport addresses are included in corresponding headers of the plurality of streams of packets by a Logic Link Control and Adaptation Layer Protocol (L2CAP) in compliance with the revision of the Bluetooth core specification; and
    wherein the plurality of streams of packets respectively correspond with a plurality of distinct Advanced Audio Distribution Profiles (A2DPs).

19. The system of claim 18, wherein the plurality of distinct A2DPs are implemented in an audio subsystem of an operating system.

20. The system of claim 19, wherein the plurality of distinct A2DPs are distinct A2DPs of a unix-based operating system distribution, and the audio subsystem includes a PulseAudio sound server.

* * * * *